(12) United States Patent
Sahlin et al.

(10) Patent No.: US 10,868,659 B2
(45) Date of Patent: *Dec. 15, 2020

(54) DOWNLINK SUBFRAME SHORTENING IN TIME-DIVISION DUPLEX (TDD) SYSTEMS

(71) Applicant: Telefonaktiebolaget LM Ericsson (publ), Stockholm (SE)

(72) Inventors: Henrick Sahlin, Mölnlycke (SE); Qiang Zhang, Sollentuna (SE); Johan Furuskog, Stockholm (SE); Stefan Parkvall, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/927,711

(22) Filed: Mar. 21, 2018

(65) Prior Publication Data

US 2018/0212745 A1 Jul. 26, 2018

Related U.S. Application Data

(63) Continuation of application No. 14/408,642, filed as application No. PCT/SE2013/051448 on Dec. 4, 2013, now Pat. No. 9,954,666.

(51) Int. Cl.
*H04W 72/04* (2009.01)
*H04L 5/00* (2006.01)
(Continued)

(52) U.S. Cl.
CPC ............ *H04L 5/14* (2013.01); *H04B 7/2615* (2013.01); *H04L 27/26* (2013.01);
(Continued)

(58) Field of Classification Search
CPC . H04B 7/2615; H04B 7/2656; H04L 27/2602; H04L 5/14; H04L 27/26;
(Continued)

(56) References Cited

U.S. PATENT DOCUMENTS 7,769,094 B2 * 8/2010 Wilhelmsson ...... H04L 27/2647
375/260
2005/0259629 A1 11/2005 Oliver et al.
(Continued)

FOREIGN PATENT DOCUMENTS

CN 101374011 A 2/2009
CN 101868033 A 10/2010
(Continued)

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 11)", 3GPP TS 36.212 V11.3.0, Jun. 2013, 1-84.
(Continued)

*Primary Examiner* — Edan Orgad
*Assistant Examiner* — Vanneilian Lalchinthang
(74) *Attorney, Agent, or Firm* — Murphy, Bilak & Homiller, PLLC

(57) ABSTRACT

A guard period for switching between uplink and downlink subframes is created by shortening a downlink subframe, i.e., by not transmitting during one or more symbol intervals at the end of the subframe. A grant message includes signaling indicating when a shortened sublimate is being transmitted. An example method is implemented in a receiving node configured to receive data from a transmitting node in subframes having a predetermined number of symbol intervals. In an LTE system, this receiving node may be a UE, and the subframes are downlink subframes. This example method includes determining that a received subframe is to be shortened, relative to the predetermined number of symbol intervals and, in response to this determination, disregarding a last part of the received subframe
(Continued)

by disregarding one or more symbols at the end of the received subframe when processing the received subframe.

16 Claims, 11 Drawing Sheets

(51) Int. Cl.
| | | |
|---|---|---|
| H04J 3/00 | (2006.01) | |
| H04L 5/14 | (2006.01) | |
| H04B 7/26 | (2006.01) | |
| H04L 27/26 | (2006.01) | |
| H04W 88/02 | (2009.01) | |
| H04W 88/12 | (2009.01) | |

(52) U.S. Cl.
CPC ..... *H04L 27/2602* (2013.01); *H04W 72/0446* (2013.01); *H04L 5/0091* (2013.01); *H04L 27/2656* (2013.01); *H04W 88/02* (2013.01); *H04W 88/12* (2013.01)

(58) Field of Classification Search
CPC . H04L 27/2656; H04L 5/0091; H04L 1/0067; H04W 72/0446; H04W 88/02; H04W 88/12; H04W 48/12; H04W 52/04; H04J 11/0069
USPC .......................................................... 370/280
See application file for complete search history.

(56) References Cited

U.S. PATENT DOCUMENTS

| | | | |
|---|---|---|---|
| 2009/0046672 A1* | 2/2009 | Malladi ................. | H04L 1/0067 370/336 |
| 2009/0201838 A1* | 8/2009 | Zhang .................. | H04B 7/2656 370/280 |
| 2011/0044255 A1* | 2/2011 | Ikeda .................. | H04L 27/2607 370/328 |
| 2011/0149813 A1* | 6/2011 | Parkvall ............... | H04B 7/2656 370/280 |
| 2011/0250897 A1 | 10/2011 | Seo et al. | |
| 2012/0014477 A1* | 1/2012 | Ko ....................... | H04B 7/0613 375/299 |
| 2012/0069794 A1 | 3/2012 | Kim et al. | |
| 2012/0294206 A1* | 11/2012 | Zhang .................. | H04B 7/2656 370/280 |
| 2013/0039193 A1 | 2/2013 | Yin et al. | |
| 2013/0114505 A1* | 5/2013 | Haim ................... | H04W 52/146 370/328 |
| 2013/0170568 A1* | 7/2013 | Prihed ............... | H04L 25/03821 375/260 |
| 2013/0286907 A1 | 10/2013 | Wei et al. | |
| 2013/0301570 A1 | 11/2013 | Xu et al. | |
| 2013/0329711 A1* | 12/2013 | Seo ...................... | H04J 11/0069 370/336 |
| 2014/0036718 A1* | 2/2014 | Gao .................... | H04W 72/121 370/254 |
| 2014/0092793 A1* | 4/2014 | Yang .................... | H04B 7/2656 370/280 |
| 2015/0003272 A1 | 1/2015 | Hu et al. | |
| 2015/0043392 A1 | 2/2015 | Susitaival et al. | |
| 2015/0208392 A1 | 7/2015 | Park et al. | |
| 2015/0295743 A1 | 10/2015 | Hwang et al. | |
| 2015/0304096 A1 | 10/2015 | Sahlin et al. | |

FOREIGN PATENT DOCUMENTS

| | | |
|---|---|---|
| CN | 102349347 A | 2/2012 |
| CN | 102754357 A | 10/2012 |
| CN | 102812768 A | 12/2012 |
| CN | 103840931 A | 6/2014 |
| CN | 104321999 A | 1/2015 |
| EP | 0948147 A1 | 10/1999 |
| EP | 1793635 A1 | 6/2007 |
| JP | 2000069550 A1 | 3/2000 |
| JP | 2010507994 A | 3/2010 |
| JP | 2010525633 A | 7/2010 |
| JP | 2012518363 A | 8/2012 |
| JP | 2013187738 A | 9/2013 |
| KR | 1020110053920 A | 5/2011 |
| KR | 20120103200 A | 9/2012 |
| RU | 2454037 C2 | 6/2012 |
| WO | 2012051756 A1 | 4/2012 |
| WO | 2012071689 A1 | 6/2012 |
| WO | 2012113131 A1 | 8/2012 |
| WO | 2013141770 A1 | 9/2013 |

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.3.0, Jun. 2013, 1-108.

Unknown, Author, "Dynamic reconfiguration of TDD UL-DL configuration", Samsung, 3GPP TSG RAN WG1 Meeting #69, R1-122267, Prague, Czech Republic, May 21-25, 2012, 1-2.

Unknown, Author, "Frame structure design and analyze of OFDM TDD for LTE", Catt et al., 3GPP TSG RAN WG1#42bis, R1-051178, San Diego, USA, Oct. 10-14, 2005, 1-9.

* cited by examiner

DOWNLINK SUBFRAME SHORTENING IN TIME-DIVISION DUPLEX (TDD) SYSTEMS

TECHNICAL FIELD

The technology disclosed herein relates generally to wireless communication systems, and more particularly relates to techniques for modifying subframe lengths in time-division duplex (TDD) systems.

BACKGROUND

In a typical cellular radio system, end-user radio or wireless terminals, also known as mobile stations and/or user equipment units (UEs), communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" or an "eNodeB". A cell is a geographical area where radio coverage is provided by the radio base station equipment at a base station site. Each cell is identified by an identity within the local radio area, which is broadcasted in the cell. The base stations communicate over the air interface operating on radio frequencies with the user equipment units (UEs) within range of the base stations.

In some radio access networks, several base stations may be connected, e.g., by landlines or microwave links, to a radio network controller (RNC) or a base station controller (BSC). The radio network controller supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM). UTRAN is a radio access network that uses wideband code-division multiple-access (W-CDMA) for communications between the UEs and the base stations, referred to in UTRAN standards as NodeBs.

In a forum known as the $3^{rd}$ Generation Partnership Project (3GPP), telecommunications suppliers propose and agree upon standards for third generation networks generally and UTRAN specifically, and investigate techniques to enhance wireless data rates and radio capacity. 3GPP has undertaken to evolve further the UTRAN and GSM based radio access network technologies. Several releases for the Evolved Universal Terrestrial Radio Access Network (E-UTRAN) specification have issued, and the standards continue to evolve. The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology where the radio base station nodes are connected to a core network, via Access Gateways (AGWs), rather than to radio network controller (RNC) nodes. In general, in LTE systems the functions of a radio network controller (RNC) node are distributed between the radio base stations nodes, referred to in the specifications for LTE as eNodeBs, and AGWs. As a result, the radio access network (RAN) of an LTE system has what is sometimes termed a "flat" architecture, including radio base station nodes that do not report to radio network controller (RNC) nodes.

Transmission and reception from a node, e.g., a radio terminal like a UE in a cellular system such as LTE, can be multiplexed in the frequency domain or in the time domain, or combinations thereof. In Frequency-Division Duplex (FDD) systems, as illustrated to the left side in FIG. 1, downlink and uplink transmission take place in different, sufficiently separated, frequency bands. In Time Division Duplex (TDD), as illustrated to the right in FIG. 1, downlink and uplink transmission take place in different, non-overlapping time slots. Thus, TDD can operate in unpaired frequency spectrum, whereas FDD requires paired frequency spectrum.

Typically, a transmitted signal in a communication system is organized in some form of frame structure. For example, LTE uses ten equally-sized subframes 0-9 of length 1 millisecond per radio frame, as illustrated in FIG. 2.

In the case of FDD operation, illustrated in the upper part of FIG. 2, there are two carrier frequencies, one for uplink transmission ($f_{UL}$) and one for downlink transmission ($f_{DL}$). At least with respect to the radio terminal in a cellular communication system, FDD can be either full duplex or half duplex. In the full duplex case, a terminal can transmit and receive simultaneously, while in half-duplex operation (see FIG. 1) the terminal cannot transmit and receive simultaneously (although the base station is capable of simultaneous reception/transmission, i.e., receiving from one terminal while simultaneously transmitting to another terminal). In LTE, a half-duplex radio terminal monitors/receives in the downlink except when explicitly instructed to transmit in the uplink in a particular subframe.

In the case of TDD operation (illustrated in the lower part of FIG. 2), there is only a single carrier frequency, $F_{UL/DL}$, and uplink and downlink transmissions are separated in time also on a cell basis. Because the same carrier frequency is used for uplink and downlink transmission, both the base station and the mobile terminals need to switch from transmission to reception and vice versa. An important aspect of a TDD system is to provide a sufficiently large guard time where neither downlink transmissions nor uplink transmissions occur, to avoid interference between uplink and downlink transmissions. For LTE, special subframes (located in subframe 1 and, in some cases, subframe 6) provide this guard time. A TDD special subframe is split into three parts: a downlink part (DwPTS), a guard period (GP), and an uplink part (UpPTS). The remaining subframes are either allocated to uplink or downlink transmission.

Time-division duplex (TDD) operation allows for different asymmetries in terms of the amount of resources allocated for uplink and downlink transmission, respectively, by means of different downlink/uplink configurations. In LTE, there are seven different configurations, as shown in FIG. 3. Each configuration has a differing proportion of downlink and uplink subframe in each 10-millisecond radio frame. For instance, Configuration 0, illustrated at the top of the figure, has two downlink subframes and three uplink subframes in each 5-millisecond half-frame, as indicated by the notation "DL:UL 2:3". Configurations 0, 1, and 2 have the same arrangement in each of the 5-millisecond half-frames in the radio frame, while the remaining configurations do not. Configuration 5, for example, has only a single uplink subframe and nine downlink subframes, as indicated by the notation "DL:UL 9:1." The configurations provide a range of uplink/downlink ratios so that the system can choose the configuration that best matches the anticipated traffic load.

To avoid significant interference between downlink and uplink transmissions between different cells, neighbor cells should have the same downlink/uplink configuration. Otherwise, uplink transmission to base station 2, BS2, in one cell may interfere with downlink transmission to base station 1, BS1, in the neighboring cell (and vice versa), as illustrated in FIG. 4. In FIG. 4, the uplink transmission of the UE in the right cell, identified in the figure as mobile station 1, MS1, is interfering with the downlink reception by the UE in the left cell, MS2. To avoid this interference, downlink/uplink asymmetry typically does not vary between cells. The downlink/uplink asymmetry configuration is signaled as part of the system information and remains fixed for a long period of time.

In LTE, the downlink is based on Orthogonal Frequency-Division Multiplexing (OFDM) while the uplink is based on Discrete-Fourier-Transform-spread (DFT-spread) OFDM, also known as Single-Carrier Frequency-Division Multiple Access (SC-FDMA). Details may be found in the 3GPP document "Evolved Universal Terrestrial Radio Access (E-UTRA); Physical channels and modulation," 3GPP TS 36.211, V11.3.0, available at www.3gpp.org. The transmission-time interval (TTI) in both cases equals a subframe of 1 millisecond, which is made up of 14 OFDM symbol intervals in downlink and 14 SC-FDMA symbol intervals in uplink, given a cyclic prefix of normal length. Portions of the OFDM and SC-FDMA symbols transmitted in these symbol intervals are used to carry user data in physical channels referred to as the Physical Downlink Shared Channel (PDSCH) and Physical Uplink Shared Channel (PUSCH). In future wireless communication systems, the length of a subframe might be significantly reduced in order to reduce user data delays. Furthermore, in future wireless systems both downlink and uplink might be based on OFDM.

Important priorities for the evolution of current wireless systems and the development of future wireless communication systems are higher bitrates and shorter delays, especially as applied to small cell scenarios. Higher bitrates can be achieved by using higher carrier frequencies, for example, where wideband spectrum resources are available. Also, TDD (Time Division Duplex) has attained an increased interest. With a dynamic TDD system, i.e., a system where the TDD configuration is not necessarily static from one frame to the next, the downlink or uplink bitrate can be instantaneously increased by adaptively changing the relation between number of intervals used for downlink (from eNodeB to UE) and uplink (UE to eNodeB). Within small cells, the propagation delays will be small, such that small guard periods can be used when switching from downlink to uplink. Accordingly, improved techniques for switching between downlink and uplink in a dynamic TDD system, while maintaining minimal interference between downlink and uplink transmissions and keeping control signaling to a minimum, are required.

SUMMARY

A fixed relation between uplink and downlink in a Time-Division Duplexing (TDD) system results in an inflexible utilization of the radio resources. A dynamic TDD system permits a more flexible usage of these resources. In various embodiments of the present invention, a guard period for switching between uplink and downlink subframes is created by shortening a downlink subframe. This is done by omitting one or more symbols at the end of a downlink subframe transmission interval, i.e., by not transmitting during one or more symbol intervals at the end of the subframe interval. Signaling is included in a downlink grant message sent to the UE, the signaling indicating to the UE that the downlink subframe is one or several OFDM (or SC-FDMA symbols) shorter than a normal subframe, where the transmission of this subframe ends one or several OFDM (or SC-FDMA) symbol intervals earlier, compared to a normal subframe.

While several embodiments are described below in the context of an LTE system, where the uplink corresponds to transmissions from a UE to an eNodeB, it should be appreciated that the disclosed techniques may be applied to other wireless systems, and do not necessarily depend on the particular hierarchical arrangement between the LTE eNodeB and UE.

Accordingly, one example method according to the techniques disclosed herein is suitable for implementation in a receiving node configured to receive data from a transmitting node in subframes occurring at defined subframe intervals and having a predetermined number of symbol intervals. In an LTE system, this receiving node may be a UE, and the subframes are downlink subframes. This example method includes determining that a received subframe is to be shortened, relative to the predetermined number of symbol intervals and, in response to this determination, disregarding a last part of the received subframe by disregarding one or more symbols at the end of the received subframe when processing the received subframe.

In some embodiments, the receiving node determines that the received subframe is to be shortened by receiving, from the transmitting node, a message containing subframe-shortening information, the subframe-shortening information indicating that the received subframe is to be shortened. The subframe-shortening information, which may be received in a grant message transmitted in a beginning portion of the received subframe, may consist of a single bit indicating that the received subframe is to be shortened by an omission of a predetermined number of symbols, for example, or may include multiple bits indicating a number of symbols to be disregarded at the end of the received subframe. In other embodiments or in other instances, the receiving node may determine that the received subframe is to be shortened without explicit signaling from the transmitting node, e.g., by determining that a transmit subframe is scheduled to be transmitted in an interval succeeding and overlapping the received subframe.

Another example method is suitable for implementation in a transmitting node that is configured to transmit data to a receiving node in subframes occurring at defined subframe intervals and having a predetermined duration, e.g., a predetermined number of symbols. In an LTE system, this node may be an LTE eNodeB, and the subframes are again downlink subframes. This example method includes transmitting, to the receiving node, a message containing subframe-shortening information, the subframe-shortening information indicating that a subframe is to be shortened, relative to the predetermined number of symbol intervals. The method further includes shortening the subframe by omitting one or more symbols at the end of the subframe when transmitting the subframe. This subframe-shortening information may be transmitted in a grant message in a first portion of the subframe, and may consist of a single bit indicating that the subframe is to be shortened by omitting a predetermined number of symbols from the end of the subframe, or may include multiple bits indicating a specific number of symbols to be omitted from the subframe.

Corresponding apparatus, i.e., receiving and transmitting nodes configured to carry out one or more of the methods summarized above are also described in detail in the description that follows.

Of course, the present invention is not limited to the above features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
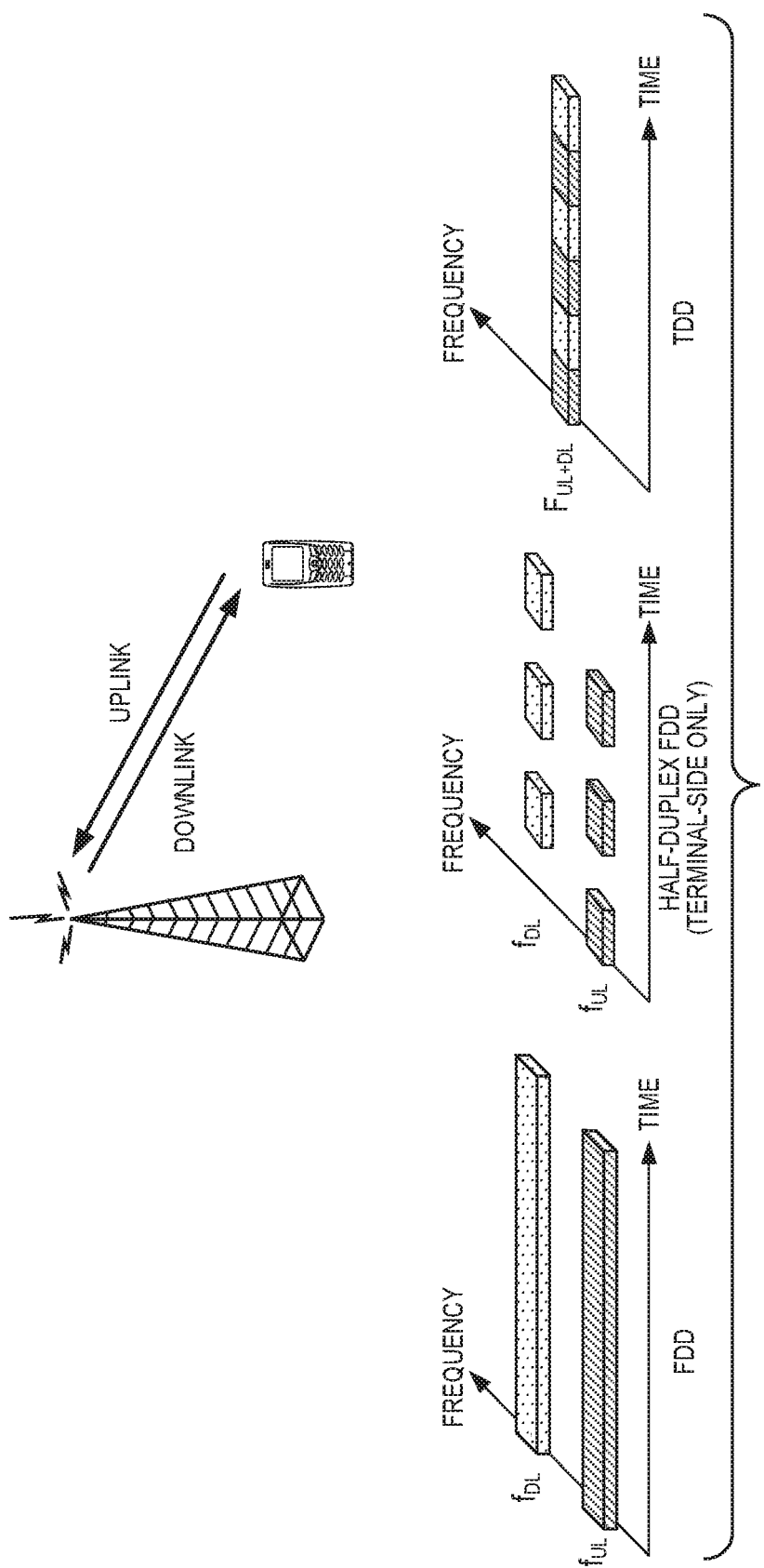
FIG. 1 illustrates frequency-division duplex, half-duplex frequency division, and time-division duplex transmissions.
Figure 2:
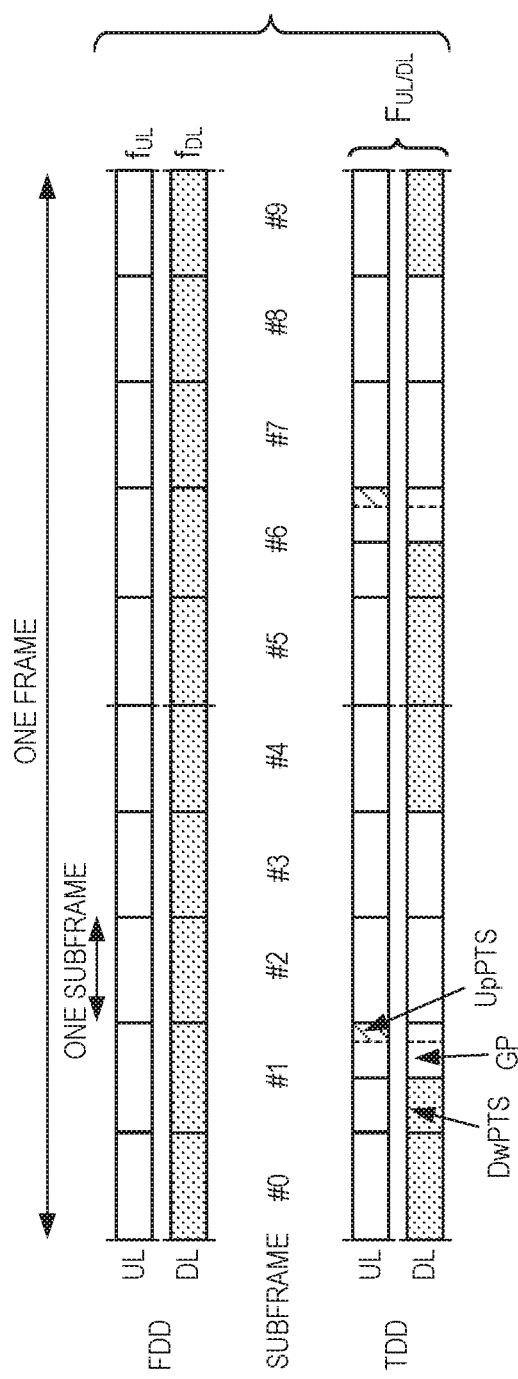
FIG. 2 illustrates uplink/downlink time/frequency structure for LTE, for the cases of frequency-division duplex (FDD) and time-division duplex (TDD).
Figure 3:
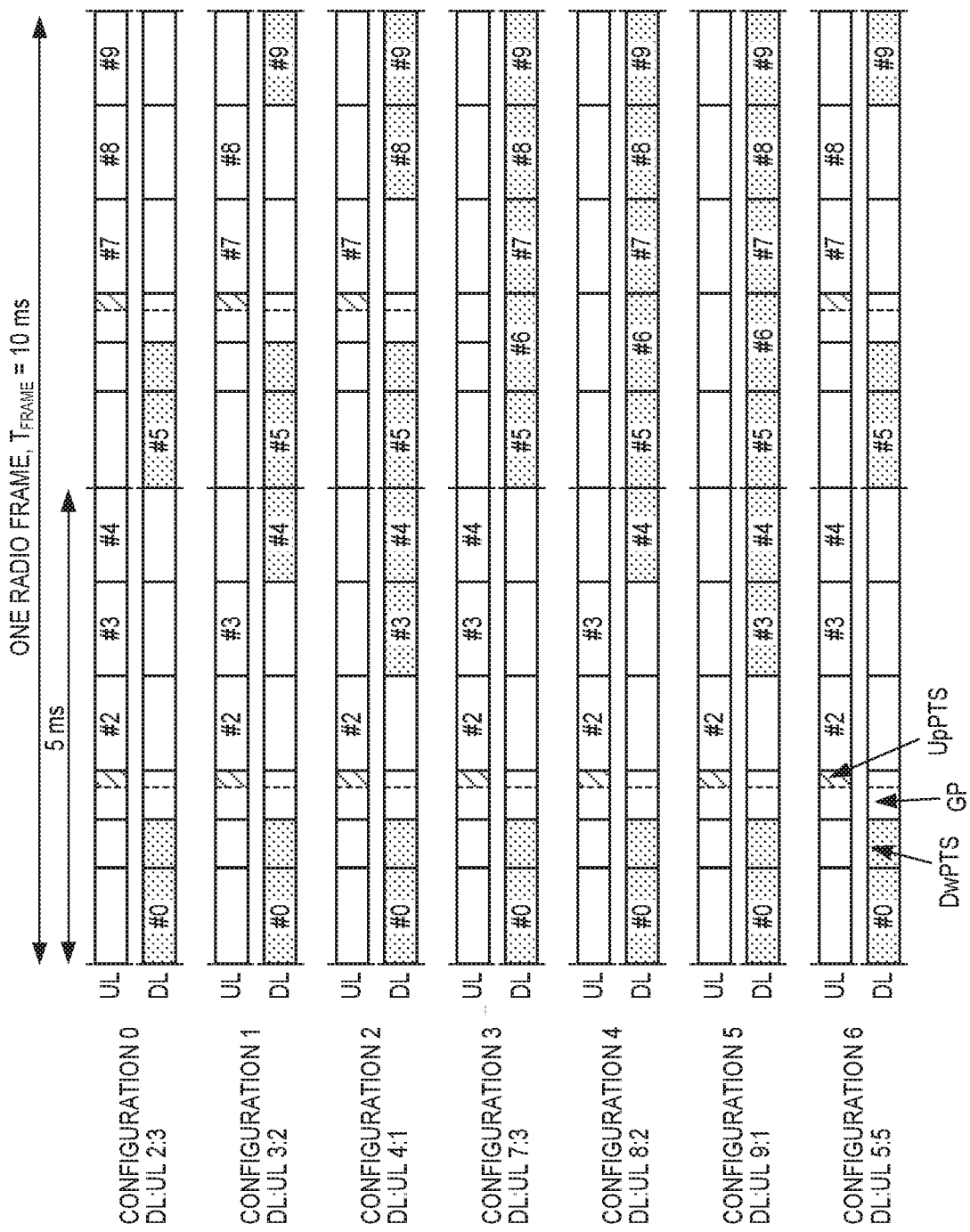
FIG. 3 is a diagram illustrating as an example of seven different downlink/uplink configurations for time-division duplex (TDD) in Long Term Evolution (LTE).
Figure 4:
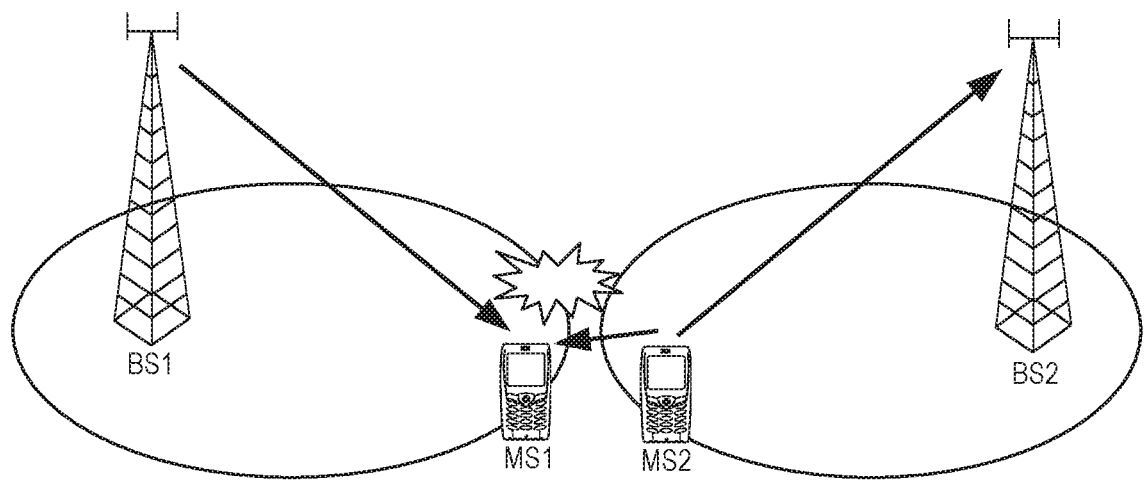
FIG. 4 illustrates an example of uplink/downlink (UL/DL) interference in time-division duplex (TDD).
Figure 5:
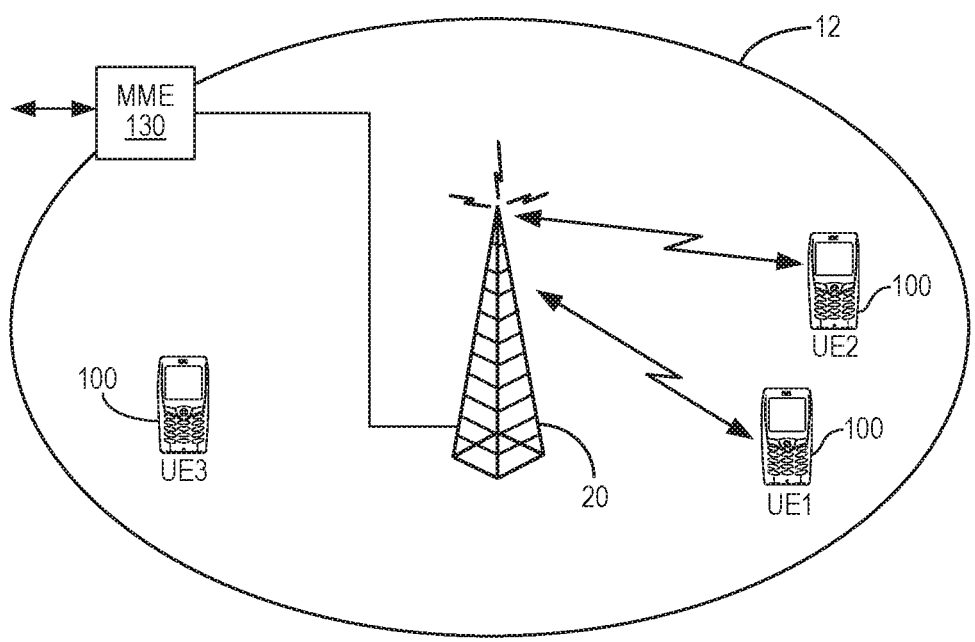
FIG. 5 illustrates a portion of an example LTE network, including multiple user equipments (UEs).

Referring now to the drawings, FIG. 5 illustrates an exemplary mobile communication network for providing wireless communication services to mobile terminals 100. Three mobile terminals 100, which are referred to as "user equipment" or "UE" in 3GPP terminology, are shown in FIG. 5. The mobile terminals 100 may comprise, for example, cellular telephones, personal digital assistants, smart phones, laptop computers, handheld computers, machine-type communication/machine-to-machine (MTC/M2M) devices or other devices with wireless communication capabilities. It should be noted that the term "mobile terminal," as used herein, refers to a terminal operating in a mobile communication network and does not necessarily imply that the terminal itself is mobile or moveable. Thus, the term as used herein should be understood to be interchangeable with the term "wireless device," and may refer to terminals that are installed in fixed configurations, such as in certain machine-to-machine applications, as well as to portable devices, devices installed in motor vehicles, etc.

The mobile communication network comprises a plurality of geographic cell areas or sectors 12. Each geographic cell area or sector 12 is served by a base station 20, which is referred to as an eNodeB in the context of an LTE radio access network, formally known as the Evolved Universal Terrestrial Radio Access Network, or E-UTRAN. One base station 20 may provide service in multiple geographic cell areas or sectors 12. The mobile terminals 100 receive signals from base station 20 on one or more downlink (DL) channels, and transmit signals to the base station 20 on one or more uplink (UL) channels.

In an LTE network, base station 20 is an eNodeB and may be connected to one or more other eNodeBs via an X2 interface (not shown). An eNodeB is also connected to an MME 130 via an S1-MME interface, and may be connected to one or more other network nodes, such as a Serving Gateway (not shown).

For illustrative purposes, several embodiments of the present invention will be described in the context of a EUTRAN system. Those skilled in the art will appreciate, however, that several embodiments of the present invention may be more generally applicable to other wireless communication systems.

As discussed above, in a TDD (Time Division Duplex) system, the same frequency is used both for downlink and uplink. Both the UE and the eNodeB must then switch between transmitting and receiving, assuming that full duplex operation is not possible. An illustration is given in FIG. 6 of the timing between downlink and uplink, which illustrates subframe transmit and receive times, at both the UE and the eNodeB, versus time, which can be measured in terms of an OFDM (or SC-FDMA) symbol index. Because of propagation delays, which may vary as the UE moves around in the coverage area of the eNodeB, downlink subframes transmitted by the eNodeB are received at the UE after a delay. A Fast-Fourier Transform, FFT, window in the UE receiver is aligned to the received subframes so that the data portion of the subframe falls completely within the FFT window, while the cyclic prefix, CP, portion of the subframe may overlap with the FFT window edge. Uplink subframes transmitted by the UE can only be transmitted after the complete of a UE switching time from receiving to transmitting modes, and are received at the eNodeB after a propagation delay. The timing of the UE transmissions is controlled by the eNodeB, so that the data-carrying portions of consecutive uplink subframes from multiple UEs do not overlap with one another and fall within the FFT window of the eNodeB receiver. Again, the portion of the subframe that includes a cyclic prefix, CP, may overlap with the edges of the eNodeB FFT window.

Figure 6:
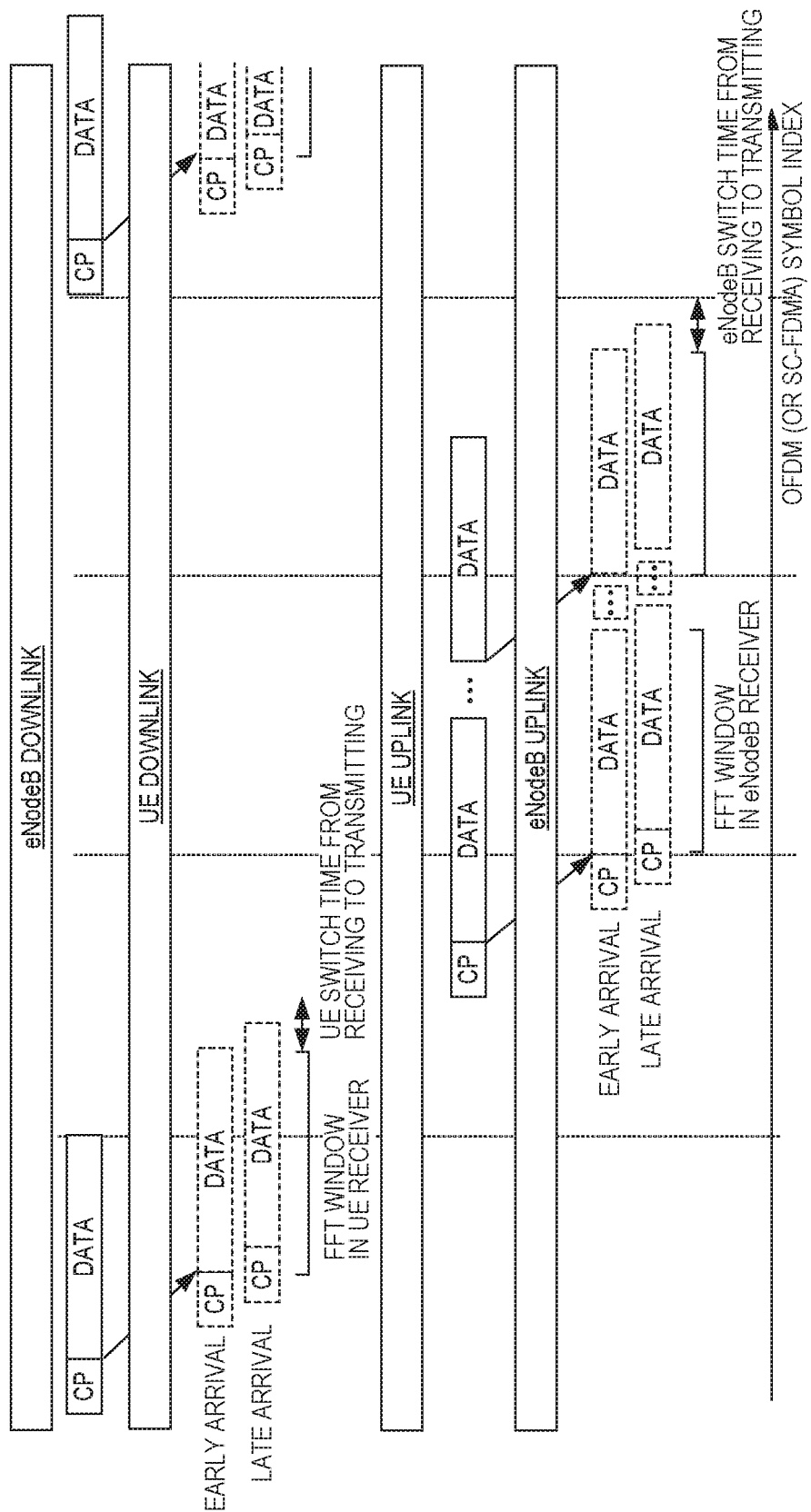
FIG. 6 illustrates downlink and uplink timing in a TDD system.
Figures 7, 8:
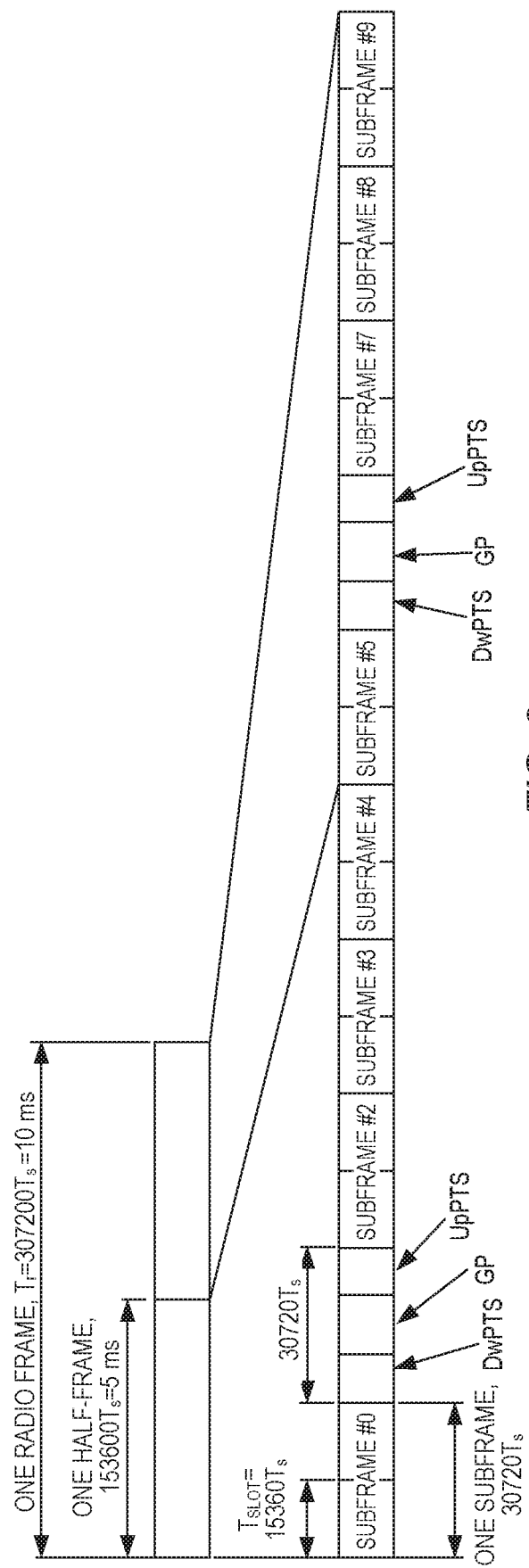
FIG. 7 shows uplink-downlink configurations according to 3GPP specifications.
FIG. 8 illustrates details of frame structure type 2 (for 5-millisecond switch-point periodicity), as specified by 3GPP.

A fixed allocation of uplink and downlink subframes is used in LTE release 11, and is defined in "Evolved Universal Terrestrial Radio Access (E-UTRA); Physical channels and modulation," 3GPP TS 36.211, V11.3.0, available at www.3gpp.org. A few predefined allocations are then specified as illustrated in FIG. 7, where uplink-downlink configurations 0-6 are illustrated, along with their respective periodicities of either 5-milliseconds or 10-milliseconds. In the chart shown in FIG. 7, each of subframe numbers 0-9 are indicated as either "D," "U,", or "S" subframes, corresponding to downlink, uplink, and special subframes, respectively. A special subframe is inserted between consecutive downlink and uplink subframes. The details of the special subframe are shown in FIG. 8. The special subframe contains OFDM and SC-FDMA symbols both for downlink and uplink respectively with a guard period in between. This guard period is used by the UE for transmitting with a timing advance, such that the uplink symbols are received within the FFT window of the eNodeB, as shown in FIG. 6. The guard period also provides time for the transmit and receive circuitry of eNodeB and UE to switch from downlink mode to uplink mode.

In a dynamic TDD system, the relation between the number of downlink subframes and uplink subframes is not fixed according to the semi-static configurations shown in FIG. 7, but can be flexibly configured depending of the current need. For example, a UE may treat every subframe as a downlink subframe unless it is explicitly instructed to transmit in a given subframe. This approach to dynamic TDD is described in U.S. Patent Application Publication 2011/0149813 A1, titled "Flexible Subframes" and published 23 Jun. 2011, the entire contents of which are incorporated herein by reference. When dynamic TDD is used, the eNodeB sends a control signal to the UE indicating when and how it is scheduled to receive (i.e., a downlink assignment) and when and how to transmit in uplink (i.e. an uplink grant). In LTE, this control signaling can be carried by either the Physical Downlink Control Channel (PDCCH) or the Enhanced Physical Downlink Control Channel (EPDCCH). The downlink assignment is transmitted in the same subframe as the user data is transmitted while the uplink grant is transmitted a few subframes before the UE is scheduled to transmit in uplink.

A fixed relation between uplink and downlink results in an inflexible utilization of the radio resources. However, with dynamic TDD, the amount of control signaling might increase significantly if all UEs must be aware of which subframes that are used as downlink and uplink subframes respectively. Furthermore, in dynamic TDD a guard period is needed between consecutive downlink and uplink subframes, to allow the UE circuitry to switch from downlink to uplink mode.

A guard period can be created by omitting one or several OFDM symbols in an uplink subframe. According to this approach, the base station includes signaling in the UL grant that indicates the UE should transmit a subframe that is one or several OFDM (or SC-FDMA symbols) shorter than a normal subframe and where the transmission of this subframe starts one or several OFDM (or SC-FDMA) symbol intervals later than a normal subframe.

Figure 9:
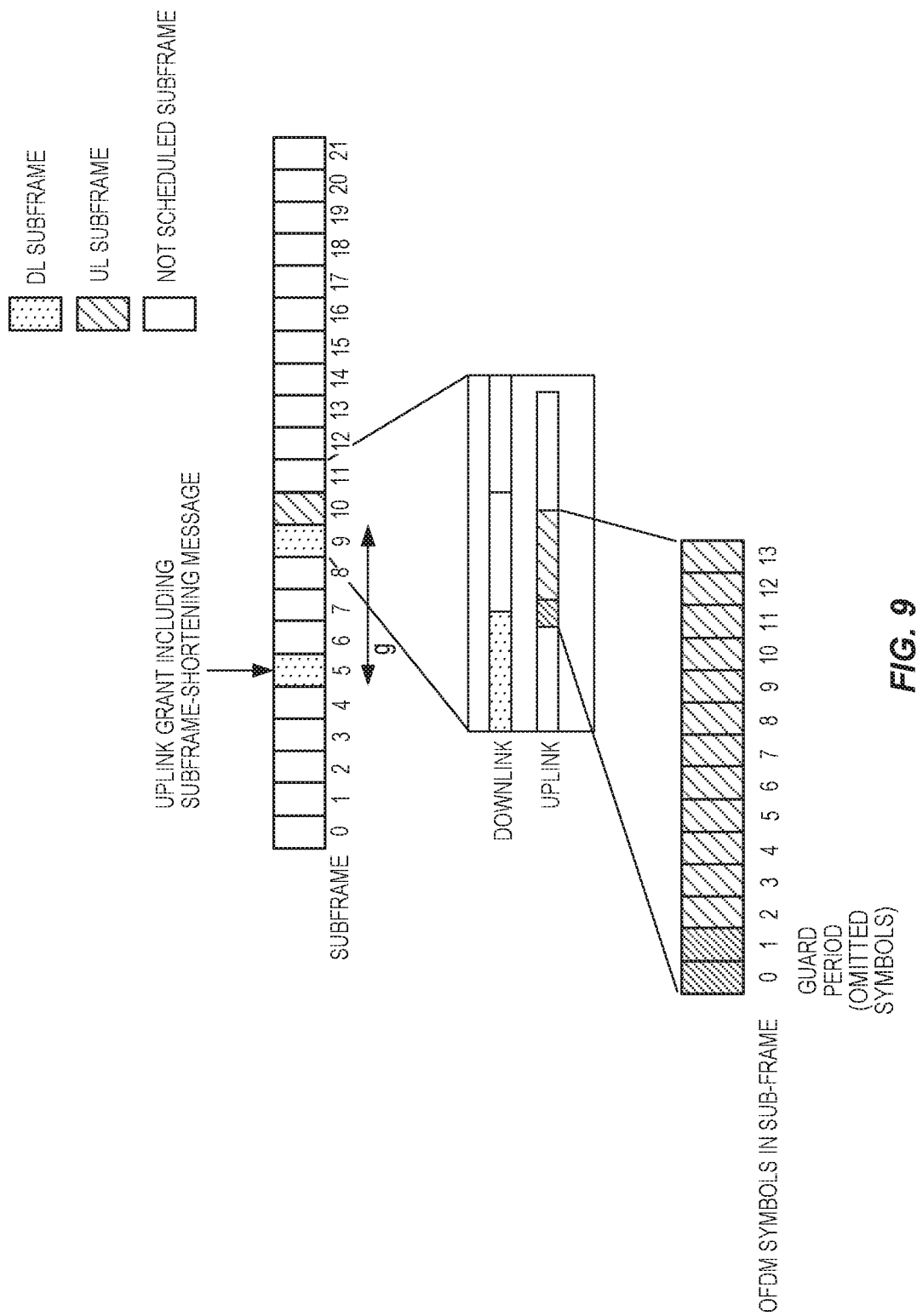
FIG. 9 illustrates shortening of uplink OFDM symbols after a downlink subframe.

The subframe timing according to this latter approach is illustrated in FIG. 9, where a series of subframes are flexibly scheduled, with one subframe scheduled for uplink use, two others scheduled for downlink use, and the remaining subframes being unscheduled. The uplink grant is transmitted in downlink in subframe n (n=5 in FIG. 9), and indicates that the UE is to transmit in uplink in subframe n+g (g=5 in FIG. 9). If eNodeB transmits in the downlink in subframe n+g−1 (subframe 9), then the UE must omit one or several OFDM (or SC-FDMA) symbols from the beginning of its transmission of uplink subframe n+g (subframe 10 in FIG. 9), to create a short guard period. A "subframe-shortening message" is thus included in the uplink grant, indicating to the UE that it needs to omit one or more symbols from the beginning of the uplink subframe transmission. As shown at the bottom of FIG. 9, the uplink subframe spans a subframe interval that includes 14 symbol intervals numbered 0-13. Each of these symbol intervals normally carries an OFDM (or SC-FDMA) symbol. However, the OFDM symbol can be omitted from one or more symbol intervals at the beginning of the subframe interval. In the example illustrated in FIG. 9, a guard period is created by omitting two OFDM symbols at the beginning of the subframe interval.

Another approach is to create the guard period by omitting one or more symbols from the end of a downlink subframe transmission. In systems that utilize redundancy encoding, the receiving UE can treat those omitted OFDM symbols as "punctured" symbols, and reconstruct the data that would normally have been carried by those symbols using normal decoding techniques. Alternatively, the receiving UE can decode the data in the remaining portion of the subframe while working around the symbol intervals that carry no data. In either case, if the guard period is created by omitting one or several OFDM symbols in downlink then the eNodeB needs to send control messages to all UEs, indicating that the last OFDM symbols of a subframe are omitted and should thus be disregarded by the UE. Thus, according to this approach a signaling is included in the downlink grant, the signaling indicating that the eNodeB is transmitting a subframe that is one or several OFDM (or SC-FDMA) symbols shorter than a normal subframe and where the transmission of this subframe ends one of several OFDM (or SC-FDMA) symbol intervals earlier than it would with a normal subframe. Note that this indication needs to be signaled to all UEs that are scheduled for this subframe.

Note that the UEs could blindly detect whether one or several of the last OFDM symbols have been omitted. However, if the UEs are not well mutually isolated then another UE might transmit in uplink during these last downlink OFDM symbols, causing interference. This interference can result in unreliable detection of the omission of OFDM symbols, causing performance degradations.

Figure 10:
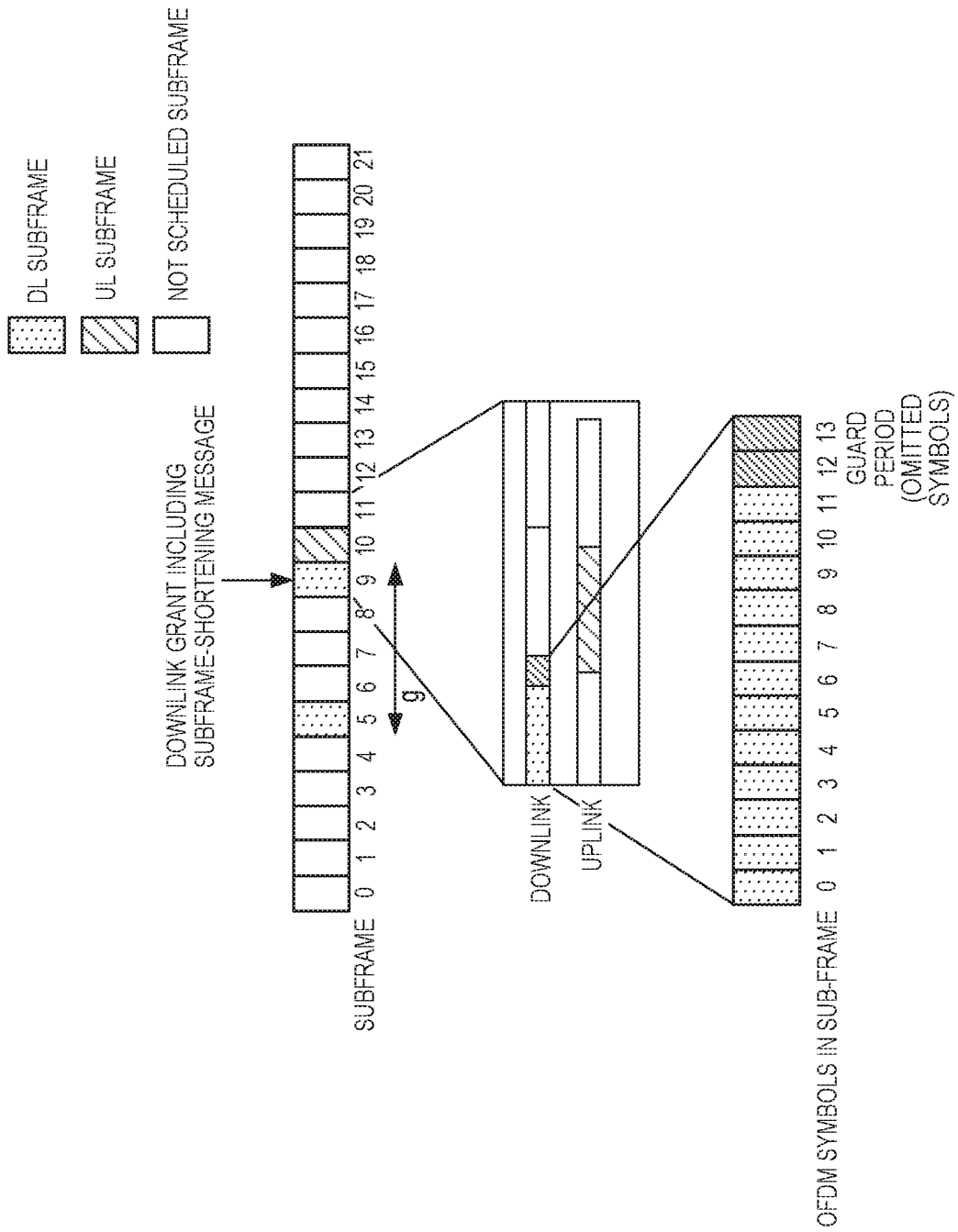
FIG. 10 illustrates shortening of a downlink subframe before an uplink subframe.

FIG. 10 illustrates the subframe shortening approach as applied to the downlink. An uplink grant is transmitted in downlink in subframe n (n=5 in FIG. 10), and indicates that a first UE is to transmit in uplink in subframe n+g (g=5 in FIG. 10). The eNodeB transmits in the downlink in subframe n+g−1 (subframe 9), and consequently omits one or several OFDM (or SC-FDMA) symbols from the end of its transmission of downlink subframe 9. A "subframe-shortening message" is thus included in the downlink grant in downlink subframe 9, indicating to the UE or UEs that are scheduled for the downlink subframe that one or more symbols are omitted from the end of the downlink subframe transmission. Note that the UE or UEs scheduled to receive the shortened subframe may differ from the UE or UEs scheduled to receive in the next subframe.

At the bottom of FIG. 10, details of the shortened downlink subframe are shown. Like the uplink subframe shown in FIG. 9, the downlink subframe shown in FIG. 10 spans a subframe interval that includes 14 symbol intervals numbered 0-13. Each of these symbol intervals normally carries an OFDM (or SC-FDMA) symbol. In the shortened downlink subframe, the OFDM symbol can be omitted from one or more symbol intervals at the end of the subframe interval, thus creating a guard period. In the example illustrated in FIG. 10, a guard period is created by omitting two OFDM symbols at the end of the subframe interval.

In some embodiments, the subframe-shortening message within the downlink grant only includes a single bit, which signals whether or not the final OFDM (or SC-FDMA) symbols of the downlink transmission are omitted. In these embodiments, the UE may be pre-configured, either by hard programming or semi-statically, e.g., by RCC signaling, with a predetermined number of symbols to disregard in the event that a subframe-shortening message is received. A somewhat more flexible format can also be used in which the subframe-shortening message explicitly indicates the number of OFDM (or SC-FDMA) symbols that are omitted. With this approach, only one OFDM (or SC-FDMA) symbol needs to be omitted if the round trip time is small, while the eNodeB might need to omit multiple OFDM symbols for UEs with large round trip times. In some embodiments, an eNodeB may be configured to always use the same indication, based on the cell size. In other embodiments, the roundtrip time for each UE is estimated and continuously tracked in the eNodeB, such that the subframe-shortening message can be adapted towards the round trip time for each individual UE.

For example, assume that two bits are used for the subframe-shortening message. In this example, the bit sequence "00" may be used to signal that no omitting of downlink OFDM (or SC-FDMA) symbols is done. Sequence "01" can be used to indicate that one OFDM (or SC-FDMA) symbols is omitted, sequence "10" indicate two OFDM (or SC-FDMA) symbols is omitted, while sequence "11" indicates the omitting of three OFDM (or SC-FDMA) symbols. Alternatively, the numbers of OFDM symbols to be omitted, as indicated by the bit(s) of the subframe-shortening message, can be semi-statically configured by higher layers.

It will be appreciated that a downlink grant can contain a grant for several subframes. If these downlink subframes are consecutive, then signaling about subframe shortening is only needed for the last of the simultaneously scheduled subframes.

In addition, a dynamic TDD system might be configured with a few subframes that are fixed for uplink and thus are never used for downlink. One or more of these fixed uplink subframes can occur inside a UE's multi-subframe downlink grant. In this case, the UE cannot receive during the fixed uplink subframe, but can continue afterwards. Here, the UE can either continue to receive all the remaining subframes according to its downlink grant, or consider one of the subframes in the grant to be "punctured" by the fixed uplink subframe, such that the total downlink transmission effectively contains one less subframe than indicated by the downlink grant. In either case, the UE must know to disregard one or several OFDM (or SC-FDMA) symbols of the subframe preceding the fixed uplink subframe. A need for this subframe shortening does not have to be signaled to the UE, since the UE is already aware of this fixed uplink subframe. If a flexible shortening of the subframe is used, then a default amount of omitted OFDM (or SC-FDMA) symbols can be used. Alternatively, a subframe shortening according to the last received subframe-shortening message within a downlink grant to the specific UE may be assumed.

Figure 11:
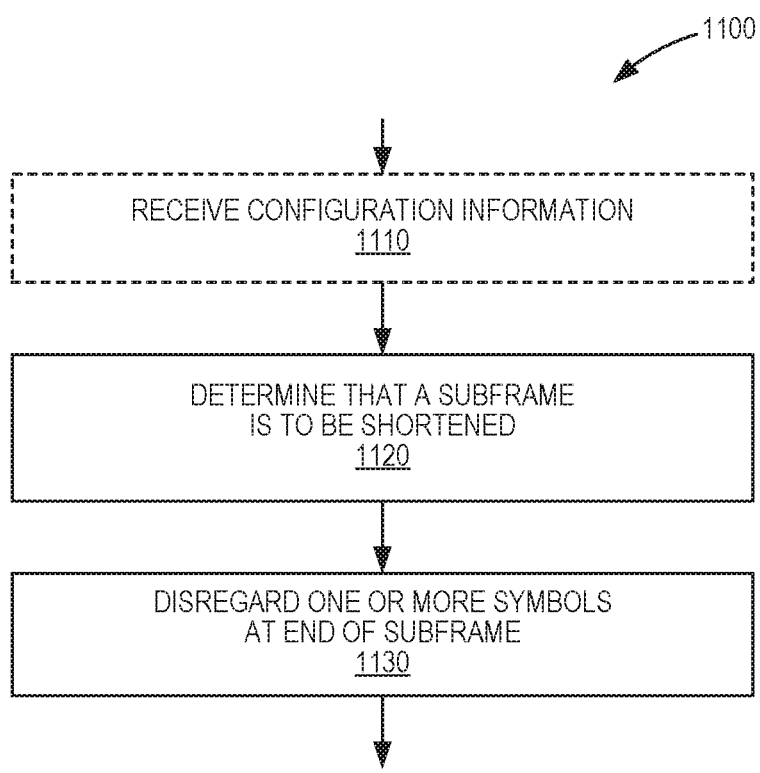
FIG. 11 is a process flow diagram illustrating an example method according to the presently disclosed techniques.

Above, various techniques for transmitting and receiving shortened subframes have been described in the context of an LTE system. It should be understood, however, that these techniques are more generally applicable to TDD wireless links between wireless nodes, and do not depend on the wireless nodes having the UE-to-base-station relationship found in an LTE system. FIG. 11 thus illustrates a method 1100 suitable for implementation in a wireless node, i.e., a receiving node that is configured to receive data in subframes occurring at defined subframe intervals and having a predetermined length. If this method is implemented in the LTE context, then this receiving node may be a UE, in communication with an eNodeB.

As shown at block 1110, the illustrated method may begin with receiving configuration information from a transmitting node, the configuration information specifying a predetermined number of symbols to be omitted from downlink subframes in the event that a shortened subframe is transmitted. In FIG. 11, this operation is illustrated with a dashed outline, indicating that this operation is not present in every embodiment or in every instance of the illustrated method.

As shown at block 1120, the illustrated method includes determining that a received subframe is shortened, relative to the predetermined length, e.g., relative to a predetermined number of symbol intervals. As discussed above, this may be done in some embodiments or in some instances by receiving a message, such as a downlink grant message, containing subframe-shortening information. In other embodiments or in other instances, however, the receiving node may determine that the received subframe is to be shortened by determining that a fixed uplink subframe succeeds and overlaps the received subframe.

As shown in block 1130, the method continues with disregarding a last part of the received subframe, in response to determining that the received subframe is to be shortened. In some embodiments, the predetermined duration of the subframe is a predetermined number of symbol intervals, in which case disregarding a last part of the received subframe comprises disregarding one or more symbol intervals at the end of the received subframe. Note that as the terms are used here, a subframe interval consists of a particular number (e.g., 14) of symbol intervals, each of which normally carries a transmitted symbol. When the subframe is shortened, one or more of the subframe intervals does not carry a transmitted symbol.

As noted above, determining that the received subframe is shortened may comprise receiving, from the transmitting node, a message containing subframe-shortening information, the subframe-shortening information indicating that the received subframe is shortened. In some embodiments, the message is received in a grant message in a first portion of the received subframe. In some embodiments, the subframe-shortening information consists of a single bit indicating that the received subframe is shortened by omitting a predetermined number of symbols at the end of the subframe. In some of these embodiments, the receiving node receives configuration information from the transmitting node, as shown at block 1110, prior to receiving the grant message, the configuration information specifying the predetermined number. In other embodiments, the subframe-shortening information received from the transmitting node specifies a number of symbols that are omitted from the end of the received subframe.

In some embodiments, the receiving node decodes data from the received subframe, by treating one or more omitted symbols at the end of the subframe interval as punctured data. If the original data was encoded using conventional redundancy coding techniques, this punctured data can be reconstructed using conventional decoding algorithms. In other embodiments, the receiving node retrieves decoded data from the first shortened subframe by de-mapping data symbols from the received subframe according to a de-mapping pattern that disregards omitted symbol intervals at the end of the subframe interval and decoding the de-mapped data symbols.

Figure 12:
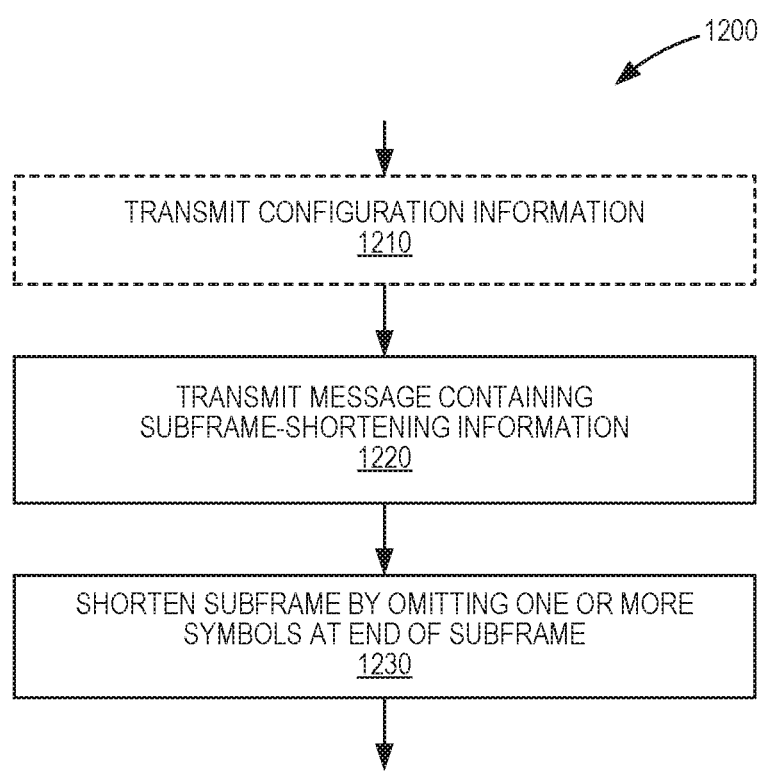
FIG. 12 is a process flow diagram illustrating another example method.

FIG. 12 illustrates a method 1200 implemented in a wireless node at the other end of the link from the receiving node corresponding to FIG. 11. Thus, the method illustrated in FIG. 12 is suitable for implementation in a transmitting node configured to transmit data in subframes occurring at defined subframe intervals and having a predetermined duration, e.g., a predetermined number of symbol intervals. In an LTE context, this transmitting node may be the eNodeB.

As shown at block 1210, the illustrated method may begin with transmitting configuration information to a receiving node, the configuration information specifying a predetermined number of symbols that are omitted from downlink subframes in the event that a shortened downlink subframe is transmitted. In FIG. 12, this operation is illustrated with a dashed outline, indicating that this operation is not present in every embodiment or in every instance of the illustrated method.

As shown at block 1220, the illustrated method includes transmitting, to the receiving node, a message containing subframe-shortening information, the subframe-shortening information indicating that a subframe transmitted by the transmitting node during a subframe interval is to be shortened. In an LTE context, this receiving node is a UE, for example. In some embodiments, the message is transmitted in a grant message in a first portion of the subframe.

As shown at block 1230, the method continues with shortening the subframe by omitting an end portion of the subframe when transmitting the subframe. In some embodiments, the duration of a subframe interval is a predetermined number of symbol intervals, in which case omitting a final portion of the subframe when transmitting the subframe comprises omitting one or more symbols at the end of the subframe.

In some embodiments, the subframe-shortening information sent to the receiving node specifies a number of symbols that are omitted from the end of the subframe. In other embodiments, the subframe-shortening information instead consists of a single bit indicating that the subframe is shortened by omitting a predetermined number of symbols from the end of the subframe. In some of these embodiments, the transmitting node transmits configuration information, to the receiving node, prior to transmitting the grant message, the configuration information specifying a number of symbols to be omitted from end of the subframe.

In the LTE context, if a guard period is created by puncturing one or several OFDM symbols in the downlink then the eNodeB can send a control messages to the UE that is scheduled in the current subframe. With this UE-specific signaling, a large reduction in the signaling overhead is achieved. This message should preferably be transmitted together with the downlink assignment. However, if this signaling is done using an Enhanced Physical Downlink Control Channel (EPDCCH) in the same subframe as the switch occurs then the UE does not know whether or not it is supposed to decode this EPDCCH with the last OFDM symbol or symbols omitted. This can be handled by performing blind decoding of the EPDCCH with none, one, or several symbols omitted, in some embodiments.

Figure 13:
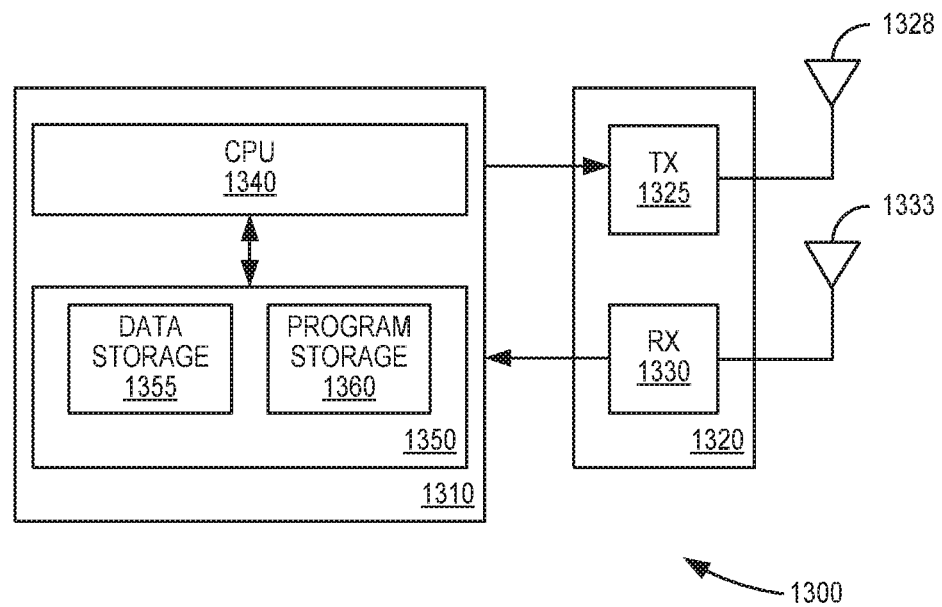
FIG. 13 is a block diagram showing components of an example user equipment.

Several of the methods described above and illustrated generally in FIGS. 11 and 12 may be implemented using radio circuitry and electronic data processing circuitry provided in a receiving node and a corresponding transmitting node, which may correspond to a mobile terminal and a base station, respectively. FIG. 13 illustrates features of an example receiving node 1300 according to several embodiments of the present invention, in this case embodied as a mobile terminal. Mobile terminal 1300, which may be a UE configured for operation in an LTE system, comprises a transceiver 1320 for communicating with one or more base stations as well as a processing circuit 1310 for processing the signals transmitted and received by the transceiver 1320. Transceiver 1320 includes a transmitter 1325 coupled to one or more transmit antennas 1328 and receiver 1330 coupled to one or more receiver antennas 1333. The same antenna(s) 1328 and 1333 may be used for both transmission and reception. Receiver 1330 and transmitter 1325 use known radio processing and signal processing components and techniques, typically according to a particular telecommunications standard such as the 3GPP standards for LTE. Because the various details and engineering tradeoffs associated with the design and implementation of such circuitry are well known and are unnecessary to a full understanding of the invention, additional details are not shown here.

Processing circuit 1310 comprises one or more processors 1340 coupled to one or more memory devices 1350 that include a data storage memory 1355 and a program storage memory 1360. Processor 1340, identified as CPU 1340 in FIG. 13, may be a microprocessor, microcontroller, or digital signal processor, in some embodiments. More generally, processing circuit 1310 may comprise a processor/firmware combination, or specialized digital hardware, or a combination thereof. Memory device 1350 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices are well known and are unnecessary to a full understanding of the invention, additional details are not shown here.

Typical functions of the processing circuit 1310 include modulation and coding of transmitted signals and the demodulation and decoding of received signals. In several embodiments, processing circuit 1310 is adapted, using suitable program code stored in program storage memory 1360, for example, to control the transmitter 1325 and receiver 1330 and to carry out one of the techniques described above for processing received subframes, including shortened subframes.

Accordingly, in various embodiments described herein, processing circuits are configured to carry out one or more of the techniques described in detail above. Likewise, other embodiments include mobile terminals (e.g., LTE UEs) including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

The mobile terminal 1300 of FIG. 13 may also be understood as an example of a wireless device configured for operation in a wireless communication network and comprising several functional modules, each of which may be implemented using analog and/or digital hardware, or a processing circuit configured with appropriate software and/or firmware, or a combination thereof. For example, in some embodiments a mobile terminal comprises a transceiver circuit that includes a receiver circuit for receiving data in subframes occurring at defined subframe intervals and having a predetermined number of symbol intervals, as well as a determining circuit for determining that a received subframe is to be shortened, relative to the predetermined number of symbols, and a subframe-processing circuit, responsive to the determining circuit, for disregarding one or more symbols at the end of the received subframe when processing the received subframe. It will be appreciated that the several variations described above in connection with the method illustrated in FIG. 11 are equally applicable to the mobile terminal implementations described here.

Figure 14:
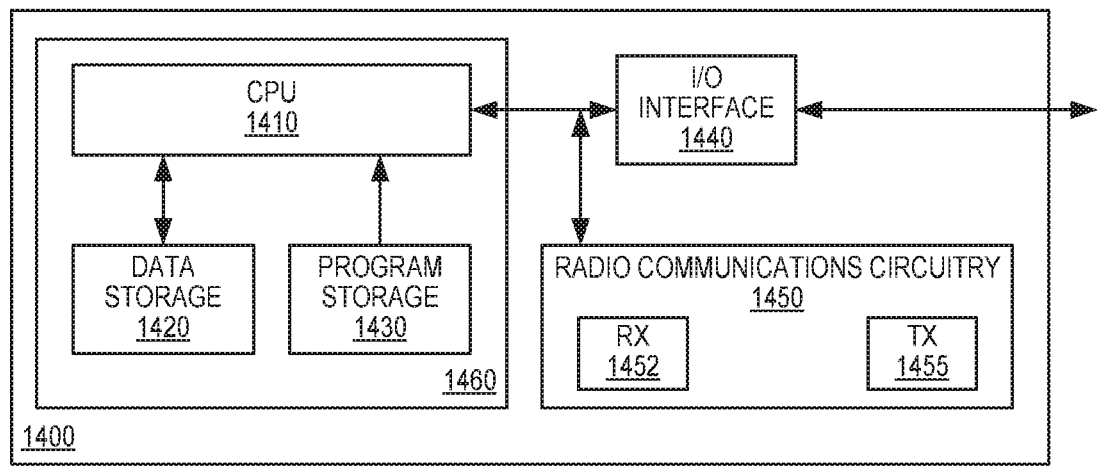
FIG. 14 is a block diagram illustrating an example base station.

FIG. 14 is a schematic illustration of an example transmitting node 1400, in this case embodied as a base station in which a method embodying one or more of the above-described techniques can be implemented. A computer program for controlling the base station to carry out one or more of the methods described herein is stored in a program storage 1430, which comprises one or several memory devices. Data used during the performance of a method embodying the present techniques is stored in a data storage 1420, which also comprises one or more memory devices. During performance of a method embodying the present techniques, program steps are fetched from the program storage 1430 and executed by a Central Processing Unit (CPU) 1410, which retrieves data as required from the data storage 1420. Output information resulting from performance of a method embodying the present invention can be stored back in the data storage 1420, or sent to an Input/Output (I/O) interface 1440, which may comprise a transmitter for transmitting data to other nodes, such as an RNC, as required. Likewise, the input/output (I/O) interface 1440 may comprise a receiver for receiving data from other nodes, for example for use by the CPU 1410. The CPU 1410, data storage 1420, and program storage 1430 together make up a processing circuit 1460. Base station 1400 further comprises radio communications circuitry 1450, which includes a receiver circuit 1452 and transmitter circuit 1455 adapted according to well-known designs and techniques to communicate with one or more mobile terminals.

According to several embodiments of the present invention, base station apparatus 1400 generally and radio communications circuitry 1450 more specifically are configured to transmit data in subframes occurring at defined subframe intervals and having a predetermined number of symbol intervals. Processing circuit 1460 is configured to control the receiver circuit and the transmitter circuit 1455 in radio communications circuitry 1450 to transmit to a second wireless node, via the transmitter circuit 1455, a message containing subframe-shortening information, the subframe-shortening information indicating that a subframe is to be shortened. The processing circuitry 1460 is further configured to control the transmitter circuit 1455 to transmit a shortened subframe to the second wireless node, by omitting an end portion of the subframe when transmitting the subframe.

Accordingly, in various embodiments of the invention, processing circuits are configured to carry out one or more of the techniques described in detail above. Likewise, other embodiments include base stations including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

The base station 1400 of FIG. 14 may also be understood as an example of a wireless device configured for operation in a wireless communication network and comprising several functional modules, each of which may be implemented using analog and/or digital hardware, or a processing circuit configured with appropriate software and/or firmware, or a combination thereof. For example, in some embodiments a base station comprises a radio communications circuit that includes a transmitter circuit, a receiver circuit for receiving data in transmit subframes occurring at defined subframe intervals and having a predetermined number of symbol intervals, as well as a grant-transmitting circuit for transmitting to a second wireless node, via the transmitter circuit, a grant message containing subframe-shortening information, the subframe-shortening information indicating that a subframe is to be shortened. The base station according to these embodiments further includes a controller circuit for controlling the transmitter circuit to omit a final portion of the subframe when transmitting the subframe. It will be appreciated that the several variations described above in connection with the method illustrated in FIG. 12 are equally applicable to the base station implementations described here.

Examples of several embodiments of the present invention have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a user equipment (UE) configured to receive data from base station in subframes of a Time Division Duplex system, wherein a predetermined number of symbol intervals is utilized in a normal subframe, the method comprising:
   receiving a subframe from the base station, wherein a grant message is included in the received subframe, the grant message containing information indicating that fewer symbol intervals will be utilized in the received subframe than in the normal subframe; and
   in response to said information indicating that fewer symbol intervals will be utilized, disregarding symbols in one or more symbol intervals at the end of the received subframe when processing the received subframe.

2. The method of claim 1, wherein the information indicating that fewer symbol intervals will be utilized specifies a number of symbol intervals that are not utilized, and wherein symbols in the specified number of symbol intervals at the end of the received subframe are disregarded.

3. The method of claim 1, further comprising switching from reception mode to transmission mode during the one or more non-utilized symbol intervals at the end of the received subframe.

4. The method of claim 1, wherein the grant message is included in a beginning portion of the received subframe.

5. A method in a base station configured to transmit data to a user equipment (UE) in subframes of a Time Division Duplex system, wherein a predetermined number of symbol intervals is utilized in a normal subframe, the method comprising:
   transmitting, to the UE, a subframe in which symbol intervals at the end of the subframe are not utilized, the subframe comprising a grant message containing information indicating that fewer symbol intervals will be utilized in the transmitted subframe than in the normal subframe.

6. The method of claim 5, wherein the information indicating that fewer symbol intervals will be utilized specifies a number of symbol intervals at the end of the subframe that are not utilized.

7. The method of claim 5, wherein the grant message is comprised in a beginning portion of the subframe.

8. A user equipment (UE) comprising a receiver circuit configured to receive data from a base station in subframes of a Time Division Duplex system, wherein a predetermined number of symbol intervals is utilized in a normal subframe, the UE further comprising a processing circuit configured to control the receiver circuit and to process subframes received from the base station, wherein the processing circuit is further configured to:
   receive a subframe from the base station via the receiver circuit, wherein a grant message is included in the received subframe, the grant message containing information indicating that fewer symbol intervals will be utilized in the received subframe than in the normal subframe, and,
   in response to the information indicating that fewer symbol intervals will be utilized, disregard symbols in one or more symbol intervals at the end of the received subframe when processing the received subframe.

9. The UE of claim 8, wherein the information indicating that fewer symbol intervals will be utilized specifies a number of symbol intervals that are not utilized, and wherein the processing circuit is further configured to disregard symbols in the specified number of symbol intervals at the end of the received subframe.

10. The UE of claim 8, wherein the processing circuit is further configured to control the receiver circuit to switch off a reception mode, and to control a transmitter circuit to switch on a transmission mode during the one or more non-utilized symbol intervals at the end of the received subframe.

11. The UE of claim 8, wherein the grant message is included in a beginning portion of the received subframe.

12. A base station, comprising a transmitter circuit configured to transmit data to a user equipment (UE) in subframes of a Time Division Duplex system, wherein a predetermined number of symbol intervals is utilized in a normal subframe, and the base station further comprising a processing circuit configured to control the transmitter circuit, characterized in that the processing circuit is further configured to:
   transmit, via the transmitter circuit to the UE, a subframe in which symbol intervals at the end of the subframe are not utilized, the subframe comprising a grant message containing information indicating that fewer symbol intervals will be utilized in the subframe than in the normal subframe.

13. The base station of claim 12, wherein the information indicating that fewer symbol intervals will be utilized specifies a number of symbol intervals at the end of the subframe that are not utilized.

14. The base station of claim 12, wherein the grant message is comprised in a beginning portion of the subframe.

15. A non-transitory computer-readable medium comprising, stored thereupon, a computer program for a user equipment (UE) configured to receive data from a base station in subframes of a Time Division Duplex system, wherein a predetermined number of symbol intervals is utilized in a normal subframe, the computer program comprising computer program code that, when executed by a processor of the UE, causes the UE to perform the steps of:
   receiving a subframe from the base station, wherein a grant message is included in the received subframe, the grant message containing information indicating that fewer symbol intervals will be utilized in the received subframe than in the normal subframe,
   in response to said information indicating that fewer symbol intervals will be utilized, disregarding symbols in one or more symbol intervals at the end of the received subframe when processing the received subframe.

16. A non-transitory computer-readable medium comprising, stored thereupon, a computer program for a base station configured to transmit data to a user equipment (UE) in subframes of a Time Division Duplex system, wherein a predetermined number of symbol intervals is utilized in a normal subframe, the computer program comprising computer program code that, when executed by a processor of the base station, causes the base station to perform the steps of:

transmitting, to the UE, a subframe in which symbol intervals at the end of the subframe are not utilized, the subframe comprising a grant message containing information indicating that fewer symbol intervals will be utilized in the subframe than in the normal subframe.

* * * * *

UNITED STATES PATENT AND TRADEMARK OFFICE
CERTIFICATE OF CORRECTION

PATENT NO. : 10,868,659 B2  
APPLICATION NO. : 15/927711  
DATED : December 15, 2020  
INVENTOR(S) : Sahlin et al.

Page 1 of 1

It is certified that error appears in the above-identified patent and that said Letters Patent is hereby corrected as shown below:

In the Specification

Column 2, Line 42, delete "downlink part (DwPTS)," and insert -- downlink pilot time slot (DwPTS), --, therefor.

Column 2, Line 43, delete "uplink part (UpPTS)." and insert -- uplink pilot time slot (UpPTS). --, therefor.

Column 3, Line 3, delete "right cell," and insert -- left cell, --, therefor.

Column 3, Line 5, delete "left cell," and insert -- right cell, --, therefor.

Column 5, Line 12, delete "illustrating as an" and insert -- illustrating an --, therefor.

Column 6, Line 6, delete "(ASIC)" and insert -- (ASIC(s)) --, therefor.

Column 7, Line 16, delete "complete" and insert -- completion --, therefor.

Column 7, Line 34, delete ""D," "U,", or" and insert -- "D," "U," or --, therefor.

Column 7, Line 50, delete "depending of" and insert -- depending on --, therefor.

In the Claims

Column 15, Line 12, Claim 1, delete "from base" and insert -- from a base --, therefor.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*